United States Patent
Kessler (10) Patent No.: US 10,561,136 B2
(45) Date of Patent: Feb. 18, 2020

(54) PHRAGMITES MECHANICAL DNA PLANT REPAIR STIMULATION AND RAIN COLLECTION METHOD TO CAUSE REED AND RHIZOME DEATH

(71) Applicant: June Kessler, Riverhead, NY (US)

(72) Inventor: June Kessler, Riverhead, NY (US)

( * ) Notice: Subject to any disclaimer, the term of this patent is extended or adjusted under 35 U.S.C. 154(b) by 0 days.

(21) Appl. No.: 16/350,563

(22) Filed: Dec. 4, 2018

(65) Prior Publication Data

US 2019/0104724 A1 Apr. 11, 2019

Related U.S. Application Data (63) Continuation-in-part of application No. 15/049,864, filed on Feb. 22, 2016, now abandoned.

(51) Int. Cl.
*A01M 21/02* (2006.01)
*A01G 22/00* (2018.01)

(52) U.S. Cl.
CPC .............. *A01M 21/02* (2013.01); *A01G 22/00* (2018.02)

(58) Field of Classification Search
CPC ................................ A01B 41/00; A01G 22/00
USPC ........................................................... 47/1.43
See application file for complete search history.

(56) References Cited

U.S. PATENT DOCUMENTS

| 5,606,822 A * | 3/1997 | Dearhammer ....... A01G 3/0475 47/1.7 |
| 6,389,746 B1 * | 5/2002 | Bransby ................... A01G 2/00 47/58.1 R |
| 10,194,649 B2 * | 2/2019 | Henderson ............ A01M 21/02 |
| 2015/0089870 A1 * | 4/2015 | Golenberg ............. A01N 61/00 47/58.1 R |

* cited by examiner

*Primary Examiner* — Nina Bhat (57) ABSTRACT

This invention kills the phragmites plant reed and rhizome by stimulating a specific DNA repair response with a mechanical cutting in the lower portion of the middle ⅓ of the reed. The DNA repair instruction for said damage is to seal the ligules closed and sucker outside the above ground ligules starting from the top down. First allow the reed to grow into its seasonal size. Cut just under a ligule in said range and remove the top. The DNA repair response is activated by the position of the cut. Rainwater enters the internal reed components over time, the DNA repair is incapable of sealing the ligule closed, rotting forms on any ligules or suckers and the reed and rhizome die. If the top ligule does seal closed and or suckers it is removed just below the ligule with a second cutting to maintain an open stalk to collect rainwater.

2 Claims, 2 Drawing Sheets

FIG.6

PHRAGMITES MECHANICAL DNA PLANT REPAIR STIMULATION AND RAIN COLLECTION METHOD TO CAUSE REED AND RHIZOME DEATH

BACKGROUND OF THE INVENTION

This invention relates to the field of DNA plant repair mechanisms, stimulation and function. In nature numerous conditions occur which challenge a plants life and continuation. In its DNA plants have response plans to physical damage for repairing wounds that result in the healing of wounds and continuation of the plants life and species. This invention triggers a DNA plant repair response that causes plant failure and death.

Phragmites plants have numerous different DNA repair responses to damage of its stalk or rhizome and it differs by the position of the damage on the plant and is relative to its size. In addition, phragmites rhizomes are interconnected to additional rhizomes along underground runners, so the plant is not just one reed and rhizome but a series of connected reeds and rhizomes along runners. Several independent runners can house multiple rhizomes of differing size crisscrossing one another.

One example of a DNA repair activation is when phragmites are cut across its lower portion, in the above ground ⅓ of the plant reed that has grown into its seasonal height. The DNA activates an immediate repair response to the cutting which is to sucker at the rhizome underground as well as on the outside of the above ground ligules effectively duplicating the reed as the sucker forms another duplicate reed with a new rhizome underground. Essentially a new emerging reed, it remains unharmed by the cutting of the original stalk even if water enters into the stalk. The rhizome sucker continues the life of the phragmites by duplication of the rhizome and forming a new reed. If the plant is cut early in the season at the top ⅓ portion of the reed and is still growing into its normal seasonal height, the DNA repair instruction causes the top portion of what is left of the reed to spiral like a telescope, effectively sealing off the reed wound to the outside elements and continuing the growth from the center of the reed upward. When the top ⅓ of the phragmites plant is cut when the stalks are dry in winter and still have a live rhizome, the DNA instruction to the top dry portions of the stalk cause them to curl in a twist at the top and close off the opening in the reed to protect the stalk from getting anything inside.

When the phragmites are folded by hand in the center ⅓ portion of the plant, the DNA instruction and repair bypasses the rhizome suckering, and seals the ligule underneath the fold instead and sends a sucker at the outside juncture of said ligule effectively continuing the plants life. The DNA repair instruction is successful underneath the folded stalk if the internal components remain dry during the repair as the stalk is supple and maintains a seal or cover over the affected stalk. The DNA response repairs the ligule underneath the fold by sealing it closed and producing a sucker on the outside of the ligule of a new reed extension continuing the life of the reed. When cut across the middle third of the reed by hand in the lower portion of the middle third of the reed above four above ground ligules and just under the fifth ligule, the DNA plant repair instruction does not sucker at the rhizome, nor does it successfully send a sucker at the top ligule. Due to the unnatural open situation of the stalk created by the forced mechanical wound in said position, the plant DNA repair is not noticeable. The plant does not seal the ligule which is now exposed to the elements including rainwater reaching the internal components of the plant and the reed dies over time. If cut above the fourth above ground ligule and upwards, the upper ligules may sucker and begin to close off the opening. A second cutting is taken in one to two weeks later when they are easily visible and a few inches long to remove any upper suckered ligules to reach the optimal position for the plant DNA repair response which is inadequate for continuing the life of the reed resulting in death to the reed and its rhizome. The optimal position of the cut where one cut is sufficient to trigger the DNA repair response which cannot repair the wound and kills the rhizome is above four above ground ligules just below the fifth ligule which is in the lower range of the middle third of the reed portion. As it rains, water collects inside the reed which begins to rot any sucker forming at the ligule and the ligule itself, eventually causing death to the entire reed and rhizome. No new rhizome is produced from the cutting as the DNA repair response did not activate it and the plant begins to fail and is noticeable within one day as the stalk turns from green to brown from the top down over time and eventually dies in entirety. Rainwater seeps down to the rhizome portion and begins to collect inside the stalk.

As each rhizome can grow deep in the ground several feet deep in some sections even 6 feet has been published, there is not any prior known way to destroy the rhizome from above ground. The use of chemical herbicides are used to control phragmites growth but has been shown to be ineffective at killing the rhizome as the application needs to continue over several years, even 8 or more and kills native vegetation and is hazardous to aquatic wildlife and water resources. Mechanical means of control of removing the upper biomass but not causing death to the rhizome has been used in prior art however the recommended cutting of 4-12 inches Immediately triggers the DNA repair response to replicate the rhizome. New reed suckers emerge from the ground within a day and can grow to several feet in a few weeks so it is not an effective control method at all. In fact it can create even more rhizomes and increase the stand as several can sucker off the original rhizome. When the phragmites are cut 4-12 inches, for the bulk of the phragmites population existing this would fall in the lower ⅓ portion of the plant and is below three above ground ligules in both young and old phragmites on average for which the DNA repair response triggers the rhizome to sucker. As each and every phragmites reed must be cut in the proper position to trigger the individual DNA repair response to cause plant death by killing the rhizome, variegated cutting relative to stalk height is necessary to kill all of the crisscrossing runners and their attached rhizomes in the position noted in the invention.

When cut in the prior art 4-12 inch designation, the rhizome suckering would be unaffected by herbicide treatment as the rhizome is deep underground. It is merely a superficial treatment to temporarily remove the upper stalk of the phragmites reed but in a month they can grow several feet so they come right back from new rhizome suckers. If all of the reeds in a clone are cut to this 4-12 inch position, the DNA repair response with be varied as each stalk will naturally vary in height. In the stand there are also independent but crisscrossing runners. Some reeds can be a few inches tall and the average 6-12 feet or more all intermixed. As the DNA repair response for damage in the phragmites living reed varies by the positional height of damage relative to the full grown size of live phragmites reed a cutting across 4-12 inches will hit most in the range where the DNA response will duplicate the rhizome, spiral closed, produce numerous suckers or telescope. As the phragmites plant is not individual reeds and rhizomes but is a combined interconnected series of rhizomes attached to each other underground by runners, damaging one will not kill others that are connected but wounded in a different position relative to stalk height thus continuing the life of the plant. Once the phragmites DNA repair response triggers the rhizome sucker when cut below three above ground ligules in the lower ⅓ portion of the plant which on average the 4-12 inches falls within this range, the phragmites plant DNA will duplicate the rhizome immediately upon cutting and reemerge from the ground as a new normal reed. I have observed new rhizome sucker spikes within one day of cutting, especially rapid when growing in water. It is impossible to treat phragmites growing in the tidal zone with herbicide without poisoning the water and aquatic wildlife as well as seagrass and other underwater plants. Since wetlands recharge drinking water aquifers also herbicide would leach down into the drinking water supply. This invention is capable of killing the rhizome underground no matter how deep it resides because it controls the repair response of the DNA instruction through an above ground positional wounding. Each reed needs to be wounded as an individual, dependent on its respective size to stimulate the specific repair response that is inadequate for healing the wound.

Burning is also documented as a control method but has proved to be ineffective at killing the rhizome as the phragmites re-emerge because again the bottom third of the stalk being damaged by fire stimulates the DNA to create a rhizome sucker underground, which is again protected from the fire as a new phragmites reed emerges from the DNA repair response to the reed being damaged by fire and the rhizome remains unaffected underground. Flooding being noted in prior art as being effective at killing phragmites is a false claim because phragmites in fact grow year round in several feet of water across the globe. Phragmites actually turn water into land. As they advance into the water and dump their wrack, a buildup of sediments occurs due to phragmites wrack biomass integrating into the coastal sediments and excessive nutrients disabling the organisms of the water to effectively utilize all of the available degrading biomass and it starts to a mass along the coastline creating land. Especially vulnerable is juvenile shellfish which cannot survive the toxic algal blooms triggered by the buildup of phragmites biomass rotting along the coastlines. Phragmites grow quite prolifically in the water, which by its nature is continually flooded. In truth and in fact there has never been a viable way to kill a phragmites rhizome with mechanical cutting without repeated, environmentally detrimental chemical herbicide use unless you physically dig it entirely out of the ground. This would not be possible in native wetland areas as the entire wetland would have to be excavated damaging and removing the entire ecosystem.

Phragmites DNA repair responses are complex and unique for each type of damage that occurs. The reeds are connected underground by rhizomes so there are many intricate workings for the plants survival coded into its DNA. Damage to each area causes a differing repair which is planned for in the plants DNA. A straight cutting across an entire stand of reeds fails to produce one specific response as the damage would be experienced in differing areas of differing size reeds, signaling differing repairs. Stands house typically young plants a few inches and those over 12 feet tall all connected to one another underground by runners attached to their rhizomes. A cutting 4-12 inches across the entire stand produces suckers underground at the rhizomes so the plants life continues regardless if a few stalks are damaged beyond repair. It is for such reason that previous technology of simply cutting across the stand a foot or less is ineffective at killing the rhizomes because in fact it produces new rhizomes in the bulk of the stand.

This invention triggers a precise DNA repair response to cause plant death to an entire phragmites stand including all reeds and rhizomes. This invention was created to provide a non-chemical way to kill the phragmites reed and rhizome from above the ground during one growing season to end phragmites invasions with one precision cut on each reed in a stand. As each mature plant has a different size, this precise location appears to be above 4 above ground ligules just under the fifth ligule which is housed in the lower portion of the middle third of the reed. There has never been a way to kill the phragmites so as to not disturb native plants and aquatic animals with excavation, burning or chemical herbicide spraying. There is no prior known way to cut a phragmites to kill the rhizome or reed as is evidenced in numerous publications the need to continue treatment year after year as new reeds emerge from suckers off the rhizome from underground sometimes even several feet underground. Even the open stalk fails to produce a negative impact on the repair which triggers the rhizomes to sucker in the lower ⅓ of the plant because the instant the cut is made the rhizome DNA replication instruction occurs. As the phragmites grow into the water along the coastlines they are rapidly expanding through tidal movements of seeds, rhizome runners and are causing toxic algal blooms. The problem with using herbicide chemicals is that they are also toxic to wildlife, pollute our water resources and kill native coastal and aquatic plants. In the water it is impossible to use herbicides to kill the phragmites and many states are now banning such practice as aquatic vegetation loss is reaching 80% or more in many areas where herbicides were used.

This invention was created to kill the phragmites by killing the entire reed down through to killing the rhizome from above ground without the use of any chemicals or harm or disturbance to nature within the one season. After the cutting of this invention the reed begins to die immediately with results visable in one day. As the reed turns brown the stalk fills with water and nature elements help to degrade the stalk slowly and naturally. Borers make homes in the stalks and further help to decay the plant matter in a slow and naturally friendly way. Fungi increase due to the excess moisture collecting in the stalk. The rhizome appears to weaken and the roots diminish as it appears that the entire plant life is shutting down immediately after the cut if the cut is below the ligule of the first green leaf closest to the ground in the middle ⅓ of the plant and above four above ground ligules. If a higher position was cut in the middle ⅓, a sucker may be produced at the top ligule remaining first. We provide a second cutting a week or two after to remove any sucker that may have been generated at the top ligule to get the right position for plant failure. As there is wrack biomass that may obscure above ground ligules at the base the fourth observable ligule or the bottom range of the middle third appear to be the position where the cutting begins to shut down the plant upon cutting. Cutting into the lower ⅓ range is to be avoided as a DNA triggering to duplicate the rhizome occurs in this range and once the rhizome is duplicated the plants life will continue and you have to let the reed grow in a begin all over again. Numerous suckers may form at the rhizome so a visual count of four above ground ligules is especially helpful for finding the position of the cut wound position which bypasses the DNA repair instruction to sucker at the rhizome and moves the repair to the middle portion of the reed signaling a suckering at the top ligule. It is possible that above the fourth ligule is an optimal spot for damage as there appears to be no visable DNA repair response as the reed immediately begins to fail, not sucker and slowly dies including the rhizome. If cut higher, upper ligules may sucker but appear to become disabled due to rain entering the stalk over time, however there is no visable suckering on a ligule that is the fourth above ground ligule when cut below the fifth ligule.

As the stalk collects rain it dies in position in entirety. Rain collection does not affect repairs from wounds to the lower third portion and upper third of the plant as the repair instructions called for by the phragmites DNA repair response is adequate for repairing the plant. The upper portion can effectively seal itself and the lower portion bypasses the need to seal itself by producing a new rhizome sucker. Only the mid portion of the plant cut in the position noted causes failure and death to the reed and rhizome as it becomes exposed to rain internally.

Invasive plant species are destroying natural ecosystems. estuaries. coastlines and forests worldwide. With modern societies movement from one natural area to another by land, sea and air, seeds and plant material can be moved from one area where they grow naturally to another where they are not native indigenous plants. When in a foreign environment plants can become invasive and destructive to natural habitats. They invade by climbing over, shading, crowding out, twining, suffocating, smothering, displacing and out-competing native plants and destroy natural native vegetation. Phragmites also known as common reeds not only displace, smother and block light to underwater natural eelgrass, they kill mussel beds that are the filters of the sea and are the home of small plant and sea life that is the beginning of the food chain in the sea. Phragmites grow into mussel beds ripping them out of the sea floor. As they advance into the sea from the coastline, dead phragmites reed stalk biomass dump into the water creating excessive wrack plant debris that is not naturally normally occurring causing nutrient excess by rotting in the water. This excessive wrack is a main contributor to nutrient levels rising and cause water temperatures to rise as they rot and decay. Numerous gasses are formed in the wet rotting phragmites biomass in estuarine environments releasing continuously especially during rainfall when the rotting biomass is disturbed by the pressure of the rainfall beating on the rotting phragmites laden sediments. When the sea nutrient level becomes too high algal blooms occur to balance the sea life by releasing neurotoxins paralyzing aquatic wildlife resulting in massive die offs of fish, plants and other animal life including terrestrial animals that drink the water and crustaceons especially juveniles. Saxitoxin is one neurotoxin that is produced in brackish estuarine environments invaded by phragmites. When an algal bloom of dinoflagellates carrying saxitoxin occurs all aquatic life become paralyzed when swimming through the bloom or when they eat shellfish that is filtering the saxitoxin laden water, small fish or other small invertebrates. It appears that the shellfish not only play a role in filtering out the toxins from the water but also poisoning small invertebrates, fish, turtles, etc. that nibble on the flesh. Paralytic shellfish poisoning can cause death to terrestrial animals as well from them ingesting shellfish when a toxic algal bloom is occurring. Phragmites wrack is destructive to coastal integrity as it lays upon native plants. When the tides rise and deposit the phragmites wrack biomass on top of native plants and eelgrass it suffocates and burns the underlying plants. Until now there has been no effective removal method for phragmites common reed for large scale removal in sea areas. Chemical removal methods are toxic to fish and wildlife and not appropriate for the water which supports all life. Chemical herbicides also kill underwater plants and coastal native species and poison water aquifers that are recharged beneath the estuarine areas. Mowing to remove the upper reed biomass as a control for phragmites wrack biomass is not possible in the sea and is not an effective eradication method on land as well as it stimulates the DNA repair response to create a new rhizome sucker.

Rhizome sucker and continue to appear as new reeds within a day and mowing must be continued several times a year and actually increases stand density by producing more rhizomes and therefore new additional reeds. Burning is not possible in the sea and in large natural areas with native vegetation as it would burn the native vegetation, heat the water, kill shellfish and crustaceons destroying the entire ecosystem while not affecting the phragmites rhizome growth but actually stimulating a DNA repair response to duplicate the rhizomes.

Laying of plastic has been noted in prior art but in actuality is ineffective in killing the phragmites rhizomes as the rhizome spikes are pointy and pierce the plastic. Once cut to be covered with plastic the underground rhizomes are stimulated to sucker and send new reeds. If the plastic is thick enough it can smother the plant however in large scale invasions or in the water or in mixed native and phragmites areas would kill all plants both natural and non-native plus disturb any waterfowl or turtle nesting areas. In the sea it would be difficult to implement plastic barriers without disturbing the entire ecosystem, cause disturbance to soil and create excess nutrients from rotting biomass. Shellfish beds and crustaceons would be smothered by the plastic as well as nesting areas for turtles, waterfowl, bugs and other creatures. It would also not be effective to use plastic in tidal wetlands as the tides would disturb the plastic if the invasive entered the water table as well as mechanically disturb valuable shellfish beds and sea grasses.

After 20 years of study and trials my phragmites DNA plant repair manipulation to cause reed and rhizome death and rain collection method has proven to be an astounding new advancement in invasive species management and is effective for killing all reed type plants including but not limited to beach grass, japanese knotweed, phragmites and other open stalk reeds or plants. The invention is intended to be used on a large scale with no negative impact on natural native environments. The invention makes obsolete the use of chemical herbicides for invasive phragmites or other plant reed removal and replaces it with an instant non chemical solution for killing phragmites reeds and their rhizome in one season. This invention is gentle and nontoxic for marine and forest environments. It is a cost effective, rapid plant removal system suitable for any worldwide environment of land or sea. This invention is a planned human interruption by mechanically wounding the phragmites plant growth in a specific position to trigger a specific DNA repair response that is inadequate for maintaining the life of the plant after the wounding. To be specific, the cutting needs to be in the lower portion of the middle third of the live green phragmites reed, it needs to be made after the reed has grown into its full size for the season, the cutting needs to be above three or more above ground ligules preferably above the fourth above ground ligule just below the fifth ligule. If cut higher in the middle third of the reed, any upper ligule sucker should be removed within a few weeks to reach the optimal position for cutting which will be above three minimum above ground ligules. It is easy to find the position after any upper suckers as they will be just above the preferred cutting position which will not sucker.

If the cutting does not maintain three or more above ground ligules of the phragmites reed the rhizome will sucker and once it does the reed has duplicated and will form an entirely new reed continuing the life of the plant. The cutting should be just under the upper most ligule to leave a length of open reed above the remaining upper ligules to collect rainwater. If the cutting is just above the top ligule, the DNA repair may successfully repair the ligule as rain may be averted from collecting in the interior of the stalk by the structure of the partially closed ligule, and the top portion above the ligule will fall off eventually leaving a sealed stalk and a successful sucker at the ligule juncture may appear.

It is interesting to note that prior art dictates a cutting at 4-12 inches. On a normal phragmites reed 12 inches generally is below the three ligule threshold for cutting above which bypasses the rhizome suckering. Even on young shorter reeds the ligules in relation to the size appears to have the same positional relationship of the ligules to the stalk size further clarifying that the DNA structure repair planning is preprogrammed to respond to wounding at specific positions on the plant with differing repairs.

This invention is a planned human interruption and circumvention of the naturally occurring growth patterns, growth signals and repair planning signals planned for in the phragmites common reed plants cell structure and DNA. Creating a man-made water reservoir from the phragmites reed stalk to continually water-log itself and seedlings and activate beneficial destructive biological activity from this man-made creation makes chemical and biological agents obsolete for use in causing phragmites and other invasive reed death.

BRIEF SUMMARY OF THE INVENTION

The invention kills entire clones of phragmites reeds and their rhizomes by triggering the repair instructions encoded in the plants DNA by cutting across each stalk to create a wound at a specific location relative to the size of each reed. First you allow the phragmites to grow into its full seasonal size. The cutting is made while the phragmites is green in a specific position on the plant, wherein said position is in the middle ⅓ of each reed, in the lower portion of the middle ⅓ of the reed, is above at least three above ground ligules and is cut just below a ligule to maintain maximum open stalk above the top remaining ligule to cause plant death maintaining a minimum of ⅓ of stalk height. If the cutting is higher in the middle ⅓ of the plant the reed may successfully sucker at the top ligules, wherein you make a second cutting to remove said ligule and sucker while still maintaining at least three above ground ligules. When cut in a precise location in the middle ⅓ of each stalk relative to its full grown height, preferably below the lowest green leaf and its adjacent ligule closest to the ground in this range, the plant makes a DNA response to the wound to repair the plant but cannot adequately repair the wound and the individual reed dies including the rhizome. I have observed dead reeds after this invention is applied with hollow rhizomes and roots. It also fails to send suckers from the rhizome when cut in this location because the plants DNA repair response is to first cause the ligule to sucker below the site of the wound and to seal closed the ligule, forgoing the rhizome suckering entirely, and thereafter attempts to repair additional ligules from the top down based on my documented successful trials in the field. Over time any suckering becomes rotted by rain entering the stalk but on occasion one will survive and for this reason we remove any subsequent suckering within a few weeks to secure plant failure and find the optimal spot for damage where the DNA repair response is inadequate at sustaining the life of the reed and rhizome. Due to natural elements entering the stalk before the ligule can seal fully closed by the unnatural human induced middle ⅓ position horizontal cutting of the plants reed and removing the top to expose the internal workings of the stalk to the elements (in nature the reed would fold and effectively close the stalk while the ligule repair is made), the DNA repair encoding planned for middle stalk ligule repair is insufficient to repair the open wound and the reed dies in its entirety including the rhizome. The advantages to the invention over prior methods is that there is no long term control necessary as the death begins as soon as the plant is cut and it is affected with moisture from water internally, the rhizome fails to duplicate at the same time of the cutting, there is no soil disturbance which could alter tidal flow and increase pollution from disturbed sediments, and all native plants and wildlife are instantly preserved. Increased biological activity further enhances natural repopulation of all native species instantly as nature naturally degrades the stalks in position over time and native seed bank and aquatic wildlife are protected and re-emerge. Because there is no use of chemicals, existing seed bank in the soil is preserved for native plant rejuvenation which where suppressed by the invasive phragmites growth. Because the cutting is targeted to the area of the phragmites reed where the DNA repair response to stalk damage is a ligule repair and sucker, which is above three above ground ligules approximately in the lower portion of the middle ⅓ of the reed, the rhizome fails to sucker as no DNA trigger to duplicate the rhizome is activated and the plant dies from the insufficient repair plan in the phragmites DNA for the condition caused by the invention of mechanically creating a wound for which the phragmites reed cannot sufficiently repair with an open stalk that is exposed to the elements.

Rain water collection mechanical phragmites invasive species removal method is a rapid, planned, incremental, mechanical cutting of phragmites plant reed to disturb growth and create water-logging. A first cut is made below the ligule of the first green leaf growing closest to the ground maintaining at least ⅓ of stalk height and interrupts the plants planned growth. As the plant has many ligules remaining it will send a new reed sucker at the top ligule to continue growing and will seal itself off at the top ligule to keep rainwater and natural elements out from the internal structure of the damaged stalk. A second cutting is taken below the sealed top ligule if successful after the reed sucker emerges outside the site of the ligule and grows for a few days or a week still maintaining ⅓ of reed height. As water collects from rain into the open stalk biological activity is activated by the fresh water reservoir in the stalk. Insect activity increases and leaf eating beetles, borers, spiders and other insects emerge onto the scene to feast on the damaged leaves, sip from the stalks, borers lay eggs into the open stalk where the larve will later chew on the internal components of the reed and all further taxes the growth of the phragmites. Spider webs mechanically bind new suckers as insects feast on them.

Rainwater continually collects in the open stalks and works its way down to the bottom and continually waterlogs the rhizome. The stalks hold the water and it starts to fill. The phragmites fails to repair the ongoing problems and does not send new root suckers or new rhizomes. Fungus emerges in abundance as well as numerous molds and mildew, internally and externally viewable, and said mold further decays the standing stalks as the phragmites die. Removed tops of the stalks are dropped to the ground to act as mulch to prohibit phragmites seedling growth on land where no chance of entering the water from tidal surges exist and to not move invasive plant material and seeds to new areas. The moist ground gradually returns to native habitat as the phragmites decompose in position so as not to disturb the soil which could potentially pollute the water or disturb tidal flow in wetland areas. No more wrack is dumped into the sea and the sea returns to normal nutrient levels rapidly. Several feet deep in some areas, excess phragmites wrack preserved in the mud flats begins to be eliminated by sea organisms providing a more solid ground to properly hold eelgrass and other seagrass and plants as the mudflats eventually return to sand for solid proper anchoring of aquatic plants on the sea floor. Excess phragmites wrack in the mud flats causes a jelly like soft base where mussel beds and eelgrass can easily shake free and die as they turn over in rough tidal currents or get banged out of the sea floor by floating debris lobbing against them in the tidal movements, causing them to be dislodged from the soft substrate of mud instead of being solidly anchored in sand. Eelgrass grows larger with the surge of nutrients due to past phragmites dumping of dead stalks already present in the mud flats and the new lack of floating wrack to suffocate them or block the sunlight from reaching the sea floor. Mussels increase their growth into the expanding eelgrass beds as this is their home and the juveniles survive better in decreasing nutrient levels as they are sensitive to toxic algal blooms that occur due to excessive phragmites wrack rotting in the mudflats. The phragmites are slowly degraded in place and destroyed from internal flooding, native plant seedlings from seed banks present in the soil and distributed by tidal movements re-emerge and the ecosystem is restored. If the phragmites have destroyed wetlands and they are devoid entirely of native species they can be reintroduced and allowed to circulate in tidal movements to their preferred positions.

Rain water collection mechanical phragmites invasive species removal method is a rapid, planned, incremental, mechanical cutting of phragmites plant reed to activate specific DNA repair instructs by a positional wounding of the reed, to bypass rhizome suckering, disturb growth and create water-logging. A first cut is made just below the ligule of the first leaf growing closest to the ground in the middle ⅓ of the plant in its lower portion, maintaining at least ⅓ of stalk height and interrupts the plants planned growth. The wound triggers the DNA repair response to the mid stalk cutting to seal the top ligule and produce a sucker off said ligule as it attempts to seal closed the stalk and continue the plants life. As the plant has many ligules remaining the DNA will instruct a repair that will send a new reed sucker at the top ligule to continue growing and will seal itself off at the top ligule to keep rainwater out from the damaged stalk. A second cutting is taken below the sealed ligule if a reed sucker emerges and grows for a few days or a week. As water collects from rain into the open stalk biological activity is activated by the fresh water reservoir in the stalk. Insect activity increases and leaf eating beetles, borers, fungi, mold, moss, spiders and other insects emerge on the scene to feast on damaged leaves, sip from the stalks, borers lay eggs into the open stalk and all further taxes the growth of and decomposes the phragmites. Spider webs mechanically bind new suckers as insects feast on them. Rainwater continually collects in the open stalks and works its way to the bottom and continually water-logs the rhizome. Suckers at the upper ligules rot away from the internal moisture. Borers will make homes in the open stalks and shred small bits of plant material above itself to keep water out of its new house. The stalks hold water and it starts to fill. The phragmites fail to repair the ongoing problems and does not send new root suckers or duplicate rhizomes as the DNA repair instruction for the cutting is to seal the upper ligule and send an upper ligule sucker. Fungus and mold now appears in abundance and further decays the standing stalks that are left in position. The cut portion is moved upland in a pile to remain onsite so as to not disburse seeds to new areas by transportation. Removed stalks are dropped to the ground to act as a mulch to prohibit phragmites seedling growth on land where no chance of entering the water from tidal surges exists and to not move invasive plant material to new areas. The moist ground gradually returns to native habitat as the phragmites decompose. No more wrack is dumped into the sea and the sea returns to normal nutrient levels rapidly. Several feet deep in some areas, excess phragmites wrack preserved in the mud flats begins to be eliminated by sea organisms providing a more solid mudflat for proper holding of eelgrass roots and slowly returning to a sandy sea floor to properly anchor eelgrass and other seagrass which are now loosely held in soft mud sediment from the phragmites wrack nutrient pollution. Excess phragmites wrack in the mudflats causes a jelly like soft base where mussel beds and eelgrass can easily shake free and die as they turn over in rough tidal currents eventually becoming beached on the shore during high tides. Eelgrass grows larger with the surge of nutrients due to the phragmites dumping of dead stalks and the new lack of floating wrack to block out the sunlight or suffocate them by mechanical smothering. Mussels increase their growth into the expanding eelgrass beds as this is their home. The phragmites are destroyed slowly in place by internal flooding and the ecosystem is restored. Native plants repopulate from surrounding areas or can be reintroduced if natural habitat has already been destroyed in the area from the phragmites invasion.

BRIEF DESCRIPTION OF THE SEVERAL VIEWS OF THE DRAWINGS

On page one of the drawings

FIG. 1 shows a phragmites reed above ground. A first cutting is taken at position 10 which is cut below the 5$^{th}$ above ground ligule in the middle ⅓ portion of the phragmites reed. Rain enters into the stalk and collects at position 20. When cut in this optimal position there is not a visual DNA repair response and the reed begins to die slowly from the top down including the rhizome.

FIG. 4 are phragmites reeds 40 mixed with native plants 15. A fold of the phragmites reed 40 triggers the DNA repair response to mid stalk fold damage to repair the upper ligule underneath the fold. A second cutting or break is made in FIG. 5 at position 30 to open the reed and allow rainwater to enter the internal components of the reed causing death to the reed and rhizome.

On page 2/2 of the drawings

DETAILED DESCRIPTION OF THE INVENTION

The invention is a nonchemical mechanical phragmites DNA repair response triggering by wounding the phragmites reed with a clear horizontal cut across each reed. First you allow the phragmites reeds in a stand to grow into their seasonal height size. Then you cut each individual phragmites reed. The optimal position to cut the reed is below the ligule of the first green leaf closest to the ground in the lower portion of the middle ⅓ section, just under the fifth above ground ligule counted from the ground upwards, leaving as long of an open stalk above the fourth above ground ligule as possible. When cut at this location the DNA plant repair fails to instruct a sucker to form at the rhizome and any growth appears to halt. Rain will enter the internal stalk and collect at the base of the reed on top of the rhizome and it begins to hold the water and fill. The remaining reed turns brown from the top down inside slowly over several weeks or months and dies over time including the rhizome. Each phragmites reed is cut in the same manner relative to its stalk height to eradicate all of the rhizomes in the stand. In a few weeks after the cut the remaining stalks are left in position and observed and if the cutting occurred higher on the stalk the DNA repair response may succeed in suckering the top ligules which sucker on the outside juncture and begin to seal closed the top ligule. A second cutting is therefore made below said suckering to reach the optimal position of maintaining four above ground, ligules and a length of open reed above said ligule. It is important to not cut in the lower ⅓ portion of the plant as the DNA repair response will trigger a rhizome sucker as soon as the cutting is made which will successfully continue the life of the plant by replicating the rhizome underground which is unaffected by the open stalk collecting rainwater as it is essentially a new emerging reed that is enclosed, and forming its own root system eventually replicating the rhizome. Three above ground ligules are approximately in the area between the upper portion of lower ⅓ of the plant and where the middle ⅓ of the plant begins after the reed has grown into its seasonal size.

Because phragmites rhizomes are connected to each other through a series of underground runners, they vary in mature seasonal height and size. It is necessary to cut each reed along the runner relative to its stalk height in the same range and number of ligules as noted above to cause the DNA repair response that leads to plant failure of each reed and rhizome and thus the entire stand. Phragmites vary in height from a few inches of new growth to 6-12 feet or taller which is the average size.

The invention manipulates a specific response in the DNA repair system by wounding the middle ⅓ of the stalk by cutting precisely below the fifth above ground ligule after which the reed and rhizome appears to be unresponsive. It does not seal the upper ligule, does not sucker along the reed and does not sucker at the rhizome and begins to fail and eventually dies. When the ligule cannot effectively seal the reed, the reed dies as it can no longer function as it collects water and sediments internally. Because phragmites are attached at the rhizome to one another and vary in height the reed and rhizome are collectively one plant but can be killed individually. It is important to cut each reed to eradicate the entire invasion otherwise surviving uncut reeds will send new runners at their rhizome and new rhizomes along the runners to continue the life of the plant. With one precise cut on each phragmites reed the entire plant species can be destroyed. Phragmites DNA has many repair instructions for wounding but is unable to survive the precise cutting method of this invention. Planned interruption of phragmites growth to halt a DNA repair response, circumvention of the DNA repair signals which instruct a sucker at the rhizome, and slowly filling a phragmites stalk with rainwater to articulate a lack of success of the DNA repair response in the reed plant phragmites to heal the wound and to cause death by one unique cut to each reed thus allowing internal intrusion of rainwater is new and novel and never contemplated in all of history.

There is a transitional point along the phragmites reed where a cut wound to the stalk changes the DNA repair response from a rhizome and ligule suckering which is in the lower ⅓ of the reed that has grown into its seasonal height, to just a ligule suckering which starts at the top ligule down and bypasses the rhizome suckering. It appears that this transitional point is in the lower portion of the middle ⅓ of a fully grown in phragmites live reed. This position is above three above ground ligules and below 5 above ground ligules. If the phragmites reed is cut in the exact position herein described the DNA repair does not succeed in mending the wound and continuing the plants life. There is a specific location above 4 above ground ligules and just under the fifth ligule where no repair activity is visibly notable when wounded, successfully killing the remaining reed portion and rhizome. One or two weeks after the first cutting any successful suckering repair at the upper ligules if the cutting is higher is subsequently removed by cutting just below the sucker where it is emanating from the ligule. Cutting in the middle ⅓ of the fully grown live reed near its bottom portion in this range seems to be the optimal spot for wounding as this is above four above ground ligules and the DNA repair response is inadequate for continuing the life of the plant from the ligule repair and fails to produce a new rhizome sucker and the reed and its rhizome dies.

Specific advantages of the invention are herein described below. The invention is a mechanical removal method suitable for large scale phragmites invasive species removal projects. The invention is specifically beneficial as it is a cost effective rapid destruction method of entire phragmites stands. There is no present removal methods for large or small partially degraded estuarine and sea water bodies with mixed estuarine habitat with native and invasive plant species as this invention, posing no harm to native plant species or aquatic wildlife. This invention requires no chemicals and gently returns areas back to their natural healthy form. This invention does not disturb sediments, alter tidal flow rapidly, does not require moving cut material outside the area and does not disturb nesting areas. This invention also allows slow sediment reduction making dredging obsolete and returns nutrient balance to water resources slowly to protect underwater aquatic vegetation from shaking free from soft sea floor sediments.

This invention is new in the art for rapid removal and destruction of phragmites that are growing in water. The invention is effective for phragmites invasions of both land and sea and where the phragmites reeds are mixed and intermingled with native eelgrass and other seagrass and mussel beds. The invention is new in the art to create a man-made water reservoir out of a plant to encourage natural biological activity and water-logging from rainfall to cause complete plant failure, slowly naturally decay to allow native plants to repopulate, preserve native seed bank by using no chemicals for cost effective restoration and disable or disrupt natural growth DNA repair plant signals for the phragmites common reed and any other reed type plants with hollow stalks, ligules and rhizomes. The present invention is particularly suitable for sensitive water areas as no harm to native coastal infrastructure by chemical application is necessary and no soil disturbance occurs as the area transitions back to a balanced ecosystem with no further work necessary than causing death to the phragmites reed and rhizome in position with this invention. Entire stands can be disabled and die from one or two consecutive cuttings.

Figure 1:
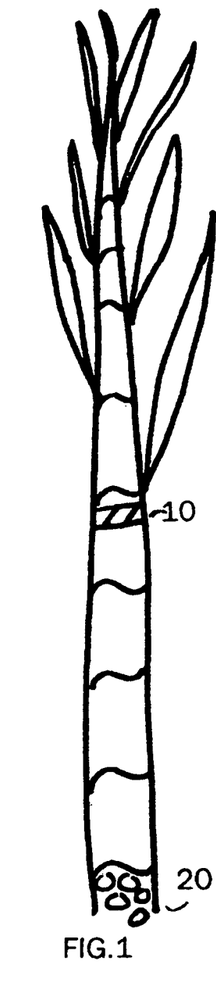

FIG. 1 of the invention shows a single phragmite reed. An entire stand can be cut at position 10 just below the first leaf emanating from the ligule on each phragmites reed in the lower portion of the middle ⅓ of the fully grown live reed maintaining at least four above ground ligules. The cut will signal the plant DNA repair system which appears to halt when cut above the third or fourth above ground ligule. Rain water will begin to enter the stalks and collect at position 20. It is important to have as much open reed as possible below the cut to accept the rain. If the cut leaves the open stalk too close to the remaining top ligule, the ligule may succeed in sealing over and enclosing the stalk. As the rain water collects it begins to water-log the ligules and rhizome and over time destroys the entire reed. Any suckers that form die over time as the rain continually enters the stalk over time, the DNA does not send a signal to sucker at the rhizome and the stalk dies over time including the rhizome on each individual reed along the runner.

Figure 2:
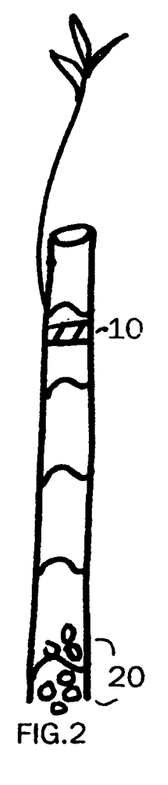
FIG. 2 shows an open phragmites stalk open at the top after cutting with a sucker off the top ligule from the DNA repair response that succeeds in sending a sucker and begins to close the ligule to seal the reed. A second cutting is taken below the suckered ligule at position 10 to maintain an open stalk to cause DNA repair response failure by reaching the optimal position causing death to the read and rhizome. The rain collection entering the internal components of the reed settles at position 20. It is important to not cut below three above ground ligules so you don't trigger the DNA repair response to duplicate the rhizome which occurs below three above ground ligules in the bottom VP portion of the reed.

Hand cutting is preferable to reach the exact optimal position on each individual reed to stimulate the DNA repair response that is unable to repair the damage. FIG. 2 is the second cutting of the open stalk if a new ligule sucker has emerged due to the position of the cutting being 5 or 6 or more ligules above ground which is in the middle ⅓ of the reed which stimulates the DNA to send a sucker at the top ligules above the third above ground ligule and to seal the top ligule closed to continue the life of the plant. By taking a second cutting just below the suckered ligules and maintain ⅓ of stalk height which is just above three above ground ligules the DNA repair response will be inadequate and the reed will begin to fail eventually dying in position including the rhizome.

Figure 3:
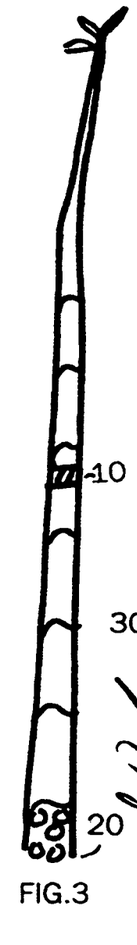
FIG. 3 is a winter phragmites stalk that has closed at the top and shed its leaves. A cutting at position 10 in the middle ⅓ of the reed opens the stalk for rain water collection which settles at position 20 and the rhizome dies.
Figure 4:
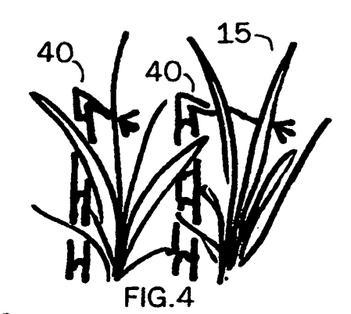
Figure 5:
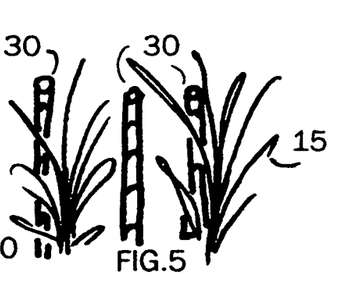

FIG. 3 is a winter stalk that has dropped its leaves and has sealed itself at the tip to prevent rain water and other elements from entering the stalk. Cutting the stalk at position 10 exposes the stalk to rain and or snow, sediments and borers over the winter and the reed and rhizome will die. Water will enter and water-log the reed and collect at position 20. It is beneficial on land to allow the stalk debris to fall in place. This is economic and also advantageous. The cut stalks act as mulch inhibiting new phragmites seeds to grow. It also eliminates any risk of moving plant material to new areas. There is no soil disturbance which further protects the seedlings from taking root. FIG. 4 addresses young phragmites reeds mixed with eelgrass or other native plants such as spartina patens. Left untouched eventually the phragmites will overcome the native grass and kill them by shading, dominating the soil with their larger rhizome and raising the soil as well as smothering estuarine plants with phragmites wrack and dropped leaves. Eelgrass roots are lifted out of the mudflats as well as entire mussel beds as the phragmites rhizome raise the soil and everything except the phragmites die. Mussels do not grow in phragmites stands as the excessive wrack smothers the juveniles, the wrack causes small outbursts of toxic algal blooms which kill juveniles from the excess nutrients and rotting of phragmites wrack biomass and the rhizome lifts the mussels from the sea floor which causes them to dry out during periods of low tide as they effectively loose capillary action moisture as the rhizomes pull them out from the water. Entire root balls of mussel beds can also be dislodged by the sediment buildup from excessive phragmites wrack overburdening the sea organisms ability to utilize the excess nutrients and as the sediments build up the phragmites eventually turn sea into land. Where native grass 15 and young phragmites 40 grow together folding the phragmites is effective as the phragmites will fold and the grass spring back unharmed. FIG. 5 further illustrates the open phragmites reeds 30 after the dried tops have been pulled off which stimulates to the phragmites DNA a second wound for which it cannot adequately repair and leaves the stalk open for collecting rainwater. Folding and subsequently opening the stalk stimulate the DNA to repair in the same manner as two cuttings. The first fold in the middle ⅓ of the reed stimulates a DNA repair response which is the same as if the reed were cut. It is quite easy to pull off the dead tops after the young phragmites have been folded and allowed to dry. The eelgrass or native plants 15 are left to continue growing and can retake the area back from the phragmites advancement. The phragmites 30 are now open for rain collection, the DNA repair response will be inadequate or unresponsive and the reed and rhizome will die. Eelgrass has prolific seeding which will circulate in the water bodies and re-establish plants easily once the phragmites are killed. Phragmites wrack that floats to shore should be monitored for removal as it appears until all of the surrounding areas phragmites reeds have been eradicated. Excess wrack can be moved to land and used as mulch around the disabled phragmites reeds. Elimination of phragmites reeds in water has been an impossible task until this invention. History has shown that entire coastlines and native habitat, eelgrass and mussel beds have been eliminated by phragmites invasive common reed due to the inability to cause death to the phragmites rhizome which is now possible with this invention. The resulting rise in hypoxic coastal events from algal blooms from increasing nutrient loading from phragmites wrack coupled with the destruction of all native coastal infrastructure due to phragmites invasions is no longer sustainable and causing dying oceans and aquatic wildlife worldwide.

This invention is suitable for land and coastal removals. Vehicles, wind, boats, animals and humans, etc can bring seedlings to coastal areas where it is the most destructive, therefore it is important to eradicate phragmites from all areas in which it is non-native. In fact after working with phragmites for 20 years it is my express opinion the phragmites needs to be eradicated worldwide as with modern movements the seeds are too easily displaced, they appear to build land and destroy water resources and harm all wildlife and native coastal ecosystems and the excess wrack causes toxic algal blooms that kill with neurotoxins all aquatic wildlife. This invention circumvents the DNA repair programming which duplicates the rhizome and forces an inadequate repair response to the positional wounding by a cut noted in this invention to facilitate a rapid failure in the entire phragmites stand invading on either land, sea, eelgrass, native plants and shellfish beds. The rapid implementation, easy operation, non-chemical eco-friendly nature of this invention advances ecological protection to new manageable heights and can be implemented in any large scale global situation. It is rapidly successful in partially degraded areas where native plants, seeds, crustaceons, mussels and other aquatic wildlife are still present and with the lack of chemical usage revolutionizes how we can protect our native vegetation, water resources and aquatic wildlife. Nature can repopulate the area cost effectively and quickly from surrounding areas as nature transports new seeds by tides, wind, animal hitch-hiking and in animal defecation as well as being preserved deep in the sediments of the phragmites invasion.

In totally degraded areas where the natural ecosystem has been eliminated it can be implemented rapidly to stop nutrient loading of water resources from yearly phragmites wrack dumping into water bodies and removed from forests where they destroy al) native plants.

Figure 6:
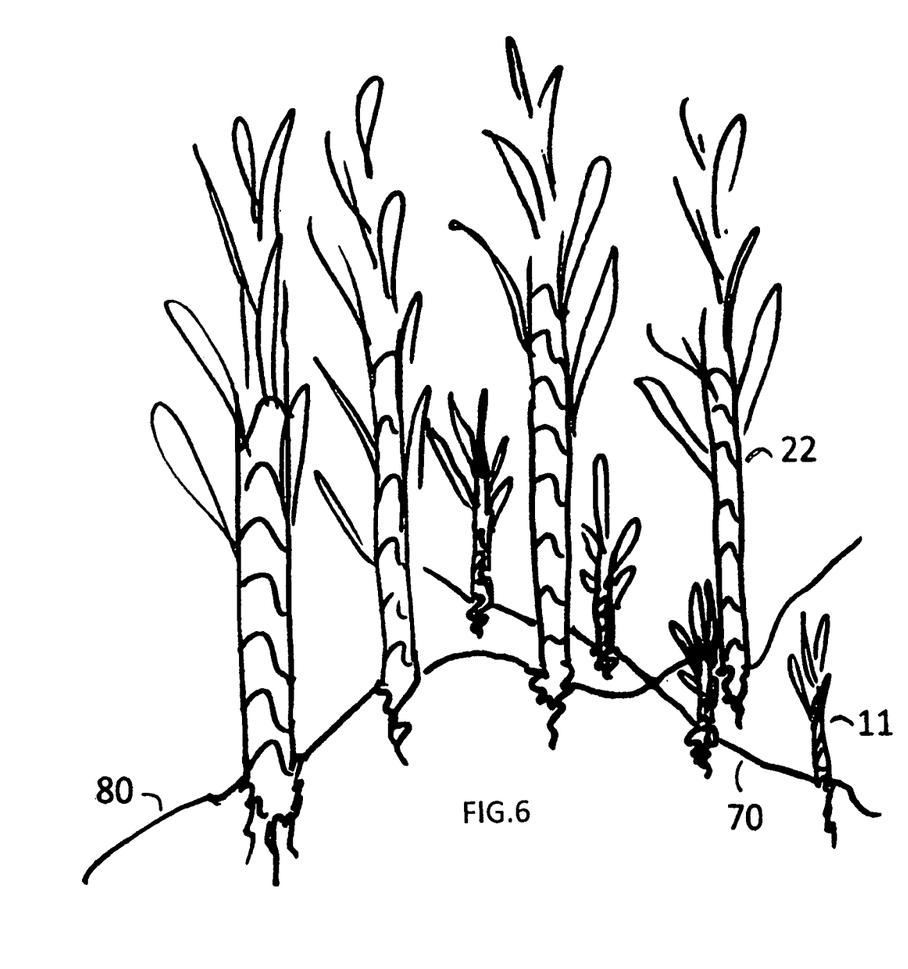
FIG. 6 depicts two independent phragmites underground runners 70 and 80 with their attached rhizomes and reeds crisscrossing one another in a phragmites stand. Runner 70 is a younger runner with small reeds 11. Runner 80 is a larger, older runner with larger phragmites 22 reeds attached. As the DNA repair response to this invention necessary for death to the reed and rhizome is triggered by wounding the middle ⅓ portion of the reed, it is easy to see the importance of cutting each reed relative to its'stalk height independently to trigger the specific DNA repair response to cause death to the reed and rhizome of each individual reed.

Elimination of algal blooms will also result as the native habitat is restored in coastal regions, the phragmites wrack dumping stopped, and tidal purging once again being an effective means of ocean cleansing where the phragmites has blocked the biomass from moving out of the water body. The destruction of global coastlines from phragmites advancement has been overlooked and ignored. Until this invention there has been no effective non chemical removal solutions for large scale phragmites invasions in coastal water removal operations where native habitat is intermixed with the destructive phragmites common reed. This invention is the first actionable technology to solve the phragmites invasion in coastal regions in the wide and vast areas necessary to remove all of the invasive plants. Increase of algal blooms and the resulting hypoxic events are undeniable. The inventor of this technology June Kessler was the first to discover that phragmites wrack is one of the main contributors to nutrient overloading in water bodies leading to these events where they are present or where they feed nutrients into the vortices that lead to the neurotoxic algal events. This invention is the answer as it will rapidly reverse the current increasing disastrous condition of nutrient polluted waters while there is still time. Warming waters and rising greenhouse gasses are resulting from coastal phragmites invasions and they must be eradicated without delay. Efficacy of this invention and all statements have been documented with 20 years of research by the inventor with numerous documented successful field trials conducted with both federal and state officials. Efficacy has been proven in repeated documented trials of complete plant destruction a§ herein described. Rapid implementation of this invention is critical for preserving natural habitat for future generations and protecting water quality for all life itself. It is important to cut each reed as an individual to trigger the specific DNA repair response desired that cannot sustain the life of the plant. FIG. 6 shows a phragmites stand with two independent runners crisscrossing one another of differing size. The DNA repair response is dictated by the position of the wounding. Due to the variation in size of each reed they must be treated as individuals when determining the position to damage on the stalk. On runner 80 the phragmites 22 are clearly larger than runner 70 with small 11 phragmites reeds. To cause plant death the cutting must be precise as is required for the invention.

The invention claimed is:

1. A method of Phragmite or open stalk reed and rhizome eradication comprising the steps of:
   a) providing Phragmite or open stalk reeds grown to a seasonal height;
   b) cutting the Phragmite or open stalk reeds at a location of between the three and four ligules from the ground thereby trigger a mid-stalk DNA repair response of the reed and removing the top portion of the reed and providing a cut portion of the reed capable of collecting water wherein said water is collected in said cut portion thereby eradicating said reed preventing propagation and growth of said Phragmite or open stalk reed.

2. A method of Phragmite or open stalk reed and rhizome eradication comprising the steps of:
   a. providing Phragmite or open stalk reeds grown to a seasonal height;
   b. performing a first cutting at the middle ⅓ of said Phragmite or open stalk reeds to trigger a DNA sucker and seal repair response in said Phragmite reed wherein the cutting removes the top portion of the reed;
   c.) performing a second cutting after said first cutting several weeks after said first cutting wherein new growth ligules suckers are cut in said second cutting wherein the cut portion of said Phragmite or open stalk reed collects water when exposed to water in said cut portion thereby eradicating and preventing growth of said Phragmite or open stock reed and rhizome.

* * * * *